United States Patent

Miki et al.

[11] Patent Number: 5,812,667
[45] Date of Patent: Sep. 22, 1998

[54] SUBSCRIBER REGISTRATION AND AUTHENTICATION METHOD

[75] Inventors: Noriki Miki, Yokosuka; Kiyomi Kumozaki, Zushi, both of Japan

[73] Assignee: Nippon Telegraph and Telephone Corporation, Tokyo, Japan

[21] Appl. No.: 526,080

[22] Filed: Sep. 11, 1995

[30] Foreign Application Priority Data

Sep. 12, 1994 [JP] Japan .................................. 6-217009

[51] Int. Cl.$^6$ .............................. H04L 9/00; H04L 9/32
[52] U.S. Cl. .............................................. 380/23; 380/25
[58] Field of Search .............................. 380/23, 24, 25, 380/49

[56] References Cited

U.S. PATENT DOCUMENTS

| | | | |
|---|---|---|---|
| 4,438,824 | 3/1984 | Mueller-Schloer | 178/22.08 |
| 5,153,919 | 10/1992 | Reeds, III | 380/23 |
| 5,249,230 | 9/1993 | Mihm, Jr. | 380/23 |

FOREIGN PATENT DOCUMENTS 61-72437  4/1986  Japan ............................. H04L 9/00

Primary Examiner—Thomas H. Tarcza
Assistant Examiner—Carmen D. White
Attorney, Agent, or Firm—Finnegan, Henderson, Farabow, Garrett & Dunner, L.L.P.

[57] ABSTRACT

The present invention provides a subscriber registration and authentication method which secures high safety and by which necessary circuit scale is small. In the method of the present invention, each network termination unit has a peculiar secret information item for identifying it and an encrypted information item obtained from the secret information item with a public key determined by the network manager; the operation system decrypts the encrypted information item stored in the network termination unit which will be registered with a secret key determined by the network manager, and registers this termination unit for the local service unit by writing the encrypted and decrypted information items into the service unit; at the beginning of providing the service, the local service unit calls the network termination unit as a communication partner by sending the encrypted information item which is peculiar for the termination unit; the called network termination unit compares the received encrypted information item with that of its own, and if these agree with each other, responds to the local service unit by using the secret information item of its own; and the local service unit confirms that the network termination unit has been regularly registered by collating the received information item with the information item of its own.

4 Claims, 8 Drawing Sheets

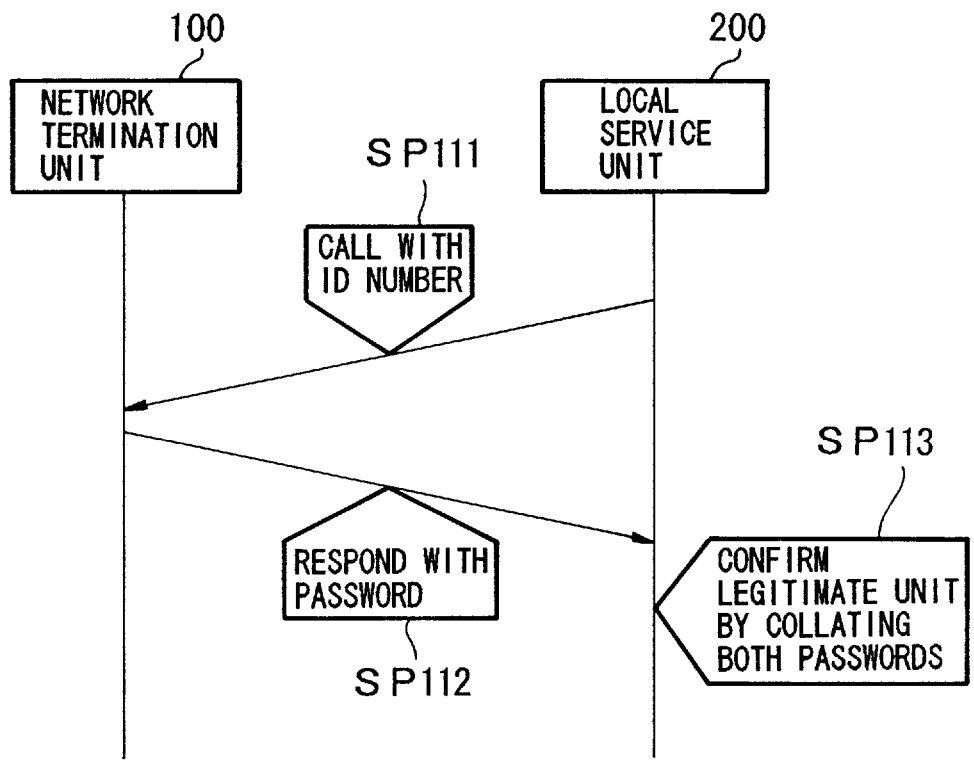
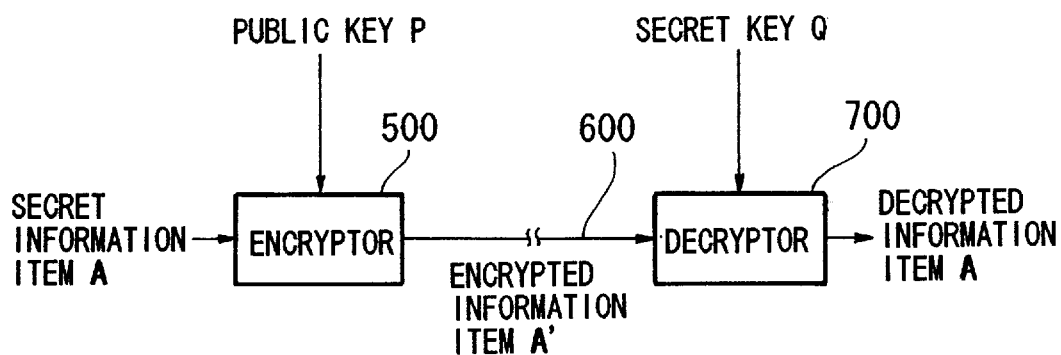

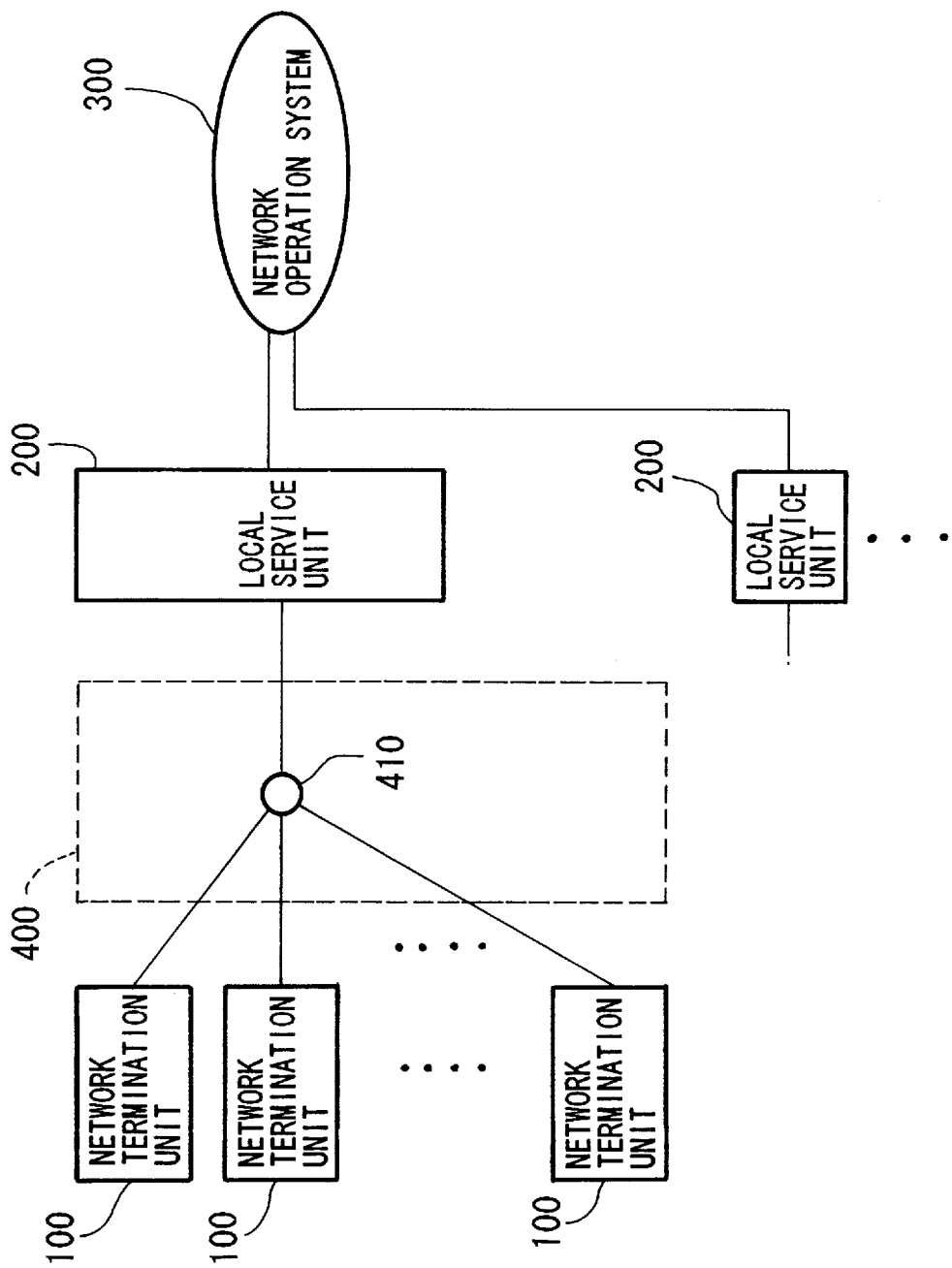

SUBSCRIBER REGISTRATION AND AUTHENTICATION METHOD

BACKGROUND OF THE INVENTION

1. Field of the Invention

The present invention relates to a subscriber registration and authentication method which is used in a communication service system in point-to-multi-point form for subscribers, in which plural network termination units are connected with one local service unit via a network and the local service unit provides information of character, image, and the like for each network termination unit.

2. Description of the Related Art

FIG. 8 is a block diagram showing a typical communication service system for subscribers. In the figure, reference numerals 100, 100, . . . indicate network termination units (often ONUs (optical network units)), reference numerals 200, 200, . . . indicate local service units (often OSUs (optical service units)), reference numeral 300 indicates a network operation system which controls the local service units 200, and reference numeral 400 indicates a network having optical splitter 410, which is provided between each local service unit 200 and the corresponding network termination units 100.

The network operation system 300, which is operated by a network manager who manages the system, registers admittable network termination unit 100 for local service unit 200 according to an action such as an application from a person who desires communication service (referred to as a "pre-subscriber", hereinafter). The local service unit 200 provides any requested service to the regularly registered network termination unit 100.

Additionally, network operation system 300 generally includes plural local service units 200, as shown in FIG. 8, and plural network termination units 100 are connected with each local service unit 200 in point-to-multi-point form, whereby each local service area is established.

Conventional subscriber registration and authentication methods for such communication service systems are such that an ID (identification) number for identifying the unit and a password for certifying that the unit is regularly registered are assigned for each network termination unit, and these ID number and password are stored both in a ROM (Read Only Memory) provided in the network termination unit and in a data base which is connected with the network operation system. Hereinbelow, conventional subscriber registration and authentication procedure will be explained with reference to FIGS. 6 and 7.

FIG. 6 shows a conventional procedure for registration. First, the network manager issues a large quantity of pairs of ID number and password (see step SP101), and stores them into the data base (see step SP102). The network manager then reports such information to a maker of network termination units 100 (see step SP103).

When the maker produces (or later forwards) each network termination unit, he stores a pair of the ID number and the password in the ROM (Read Only Memory) of the unit (see step SP104)

The above ID number which is appended to the network termination unit 100 must be registered for the network operation system 300 after a pre-subscriber purchases this unit (see step SP105). This duty is ordinarily performed such that the pre-subscriber reports the ID number of the purchased termination unit to the network manager (see step SP106), and the network manager registers it in the network operation system 300 (see step SP107).

The network operation system 300 performs retrieval from the data base based on the registered ID number (see step SP108), reads out the corresponding password (see step SP109), and writes this ID number and password pair into a memory of the local service unit 200 (see step SP110).

At the time of communication, as shown in FIG. 7, local service unit 200 calls each registered network termination unit 100 with the corresponding ID number at regular intervals (see step SP111), while the called network termination unit 100 responds to the local service unit with the password when desiring a service (see step SP112). The local service unit 200 then confirms that this network termination unit has been regularly registered, by collating the received password with the password stored in its memory (see step SP113).

In the above-mentioned conventional registration and authentication method, there is a problem that a large-size data base is necessary for storing a large quantity of ID numbers and passwords which cover all network termination units of all local areas. Additionally, for preventing the leakage of any ID number or password, the safety of the transmission between each network termination unit, local service unit, the network operation system, and the data base must be guaranteed; thus, the circuit scale of each unit is enlarged due to the addition of an encryption circuit and the like.

SUMMARY OF THE INVENTION

In consideration of the above problems, the purpose of the present invention is to provide a subscriber registration and authentication method whereby no large-scale data base is necessary and the circuit scale of each unit can be small.

Therefore, the present invention provides a subscriber registration and authentication method, used in a communication service system in which plural network termination units are connected via a communication network with a local service unit controlled by an operation system which is managed by a network manager and the local service unit provides services for each registered network termination unit, said method for registering each network termination unit for the local service unit and authenticating the registered network termination unit before providing the service, wherein: each network termination unit has a peculiar secret information item for identifying the network termination unit and an encrypted information item obtained by encrypting the secret information item with a public key which is determined by the network manager, and said method comprises: step (r), performed by the operation system, of decrypting the encrypted information item stored in the network termination unit which will be registered by using a secret key which is determined by the network manager, and registering this network termination unit for the local service unit by writing the encrypted and decrypted information items into the local service unit; step (c1), performed by the local service unit at the beginning of providing the service, of calling the network termination unit as a communication partner by sending the encrypted information item which is peculiar for the network termination unit; step (c2), performed by the called network termination unit, of comparing the received encrypted information item with the encrypted information item of its own, and if these agree with each other, responding to the local service unit by using the secret information item of its own; and step (c3), performed by the local service unit, of confirming that the network termination unit as a communication partner has been regularly registered by collating the information item received from the network termination unit with the information item of its own.

Accordingly, the present invention assures that the original secret information item cannot be regenerated from the public key (assigned to a maker) and the encrypted information item (or encrypted password) alone, by making use of the one-directional characteristic of the public key encryption technique. The present invention can also make it possible to remove encryption/decryption circuits from both the local service unit and the network termination unit.

In the encryption using the public key encryption technique, a secret information item is encrypted with the public key and sent. At the side which receives the encrypted information item, the item is decrypted with the secret key to regenerate the original secret information item. The merit of this public key encryption technique is that the original secret information item can never be regenerated from the encrypted information item and the public key alone.

According to the present information, highly safe authentication by making use of the one-directional characteristic of the public key encryption technique can be realized. Furthermore, no large-size data base for previously storing ID numbers and passwords is necessary, and by previously storing the secret information item and the encrypted information item of the secret item in the local service unit and the network termination unit, no encryption/decryption circuit is necessary in both the units.

The subscriber registration and authentication method may be modified so that each network termination unit has a setting means for setting up an ID number assigned by the network manager, the number being peculiar to the network termination unit, and the method further comprises: step (a1), performed by the operation system, of writing the ID number into the local service unit; step (a2), performed by the local service unit when the network termination unit which has the set ID number and will be registered is connected to the communication network, of calling the corresponding network termination unit by sending the ID number; step (a3), performed by the network termination unit called by the local service unit, of comparing the received ID number with the ID number which has been set up by the setting means, and if these agree with each other, sending the encrypted information item of its own to the local service unit; and step (a4), performed by the local service unit, of transferring the encrypted information item received from the network termination unit to the operation system, and the step (r) performed by the operation system comprises decrypting the transferred encrypted information item with the secret key, and registering this network termination unit for the local service unit by writing the encrypted and decrypted information items and the ID number as a group of information items.

According to this case, the automatic and remote registration of the network termination unit can be realized by calling the network termination unit from the local service unit when the network termination unit is connected to the communication network. In this case, it is no longer necessary to previously register the encrypted password to the local service unit according to the report from a subscriber.

Furthermore, it is possible to use only a part of the encrypted password for calling the network termination unit at the beginning of providing the service by using the ID number together; thus, the safety of the password can be much more improved.

BRIEF DESCRIPTION OF THE DRAWINGS

FIG. 7 shows a conventional procedure at the beginning of the communication.

FIG. 8 is a block diagram showing an example of the communication service system for subscribers.

FIG. 9 is for the purpose of explaining the public key encryption technique.

DESCRIPTION OF THE PREFERRED EMBODIMENTS

Hereinafter, embodiments according to the present invention will be explained with reference to the figures.

Here, prior to the embodiments of the subscriber registration and authentication method, ordinary encryption using public key encryption technique will be explained below with reference to FIG. 9. In the figure, in ordinary cases, plural secret information items corresponding to plural communication partners are generally transmitted in transmission line 600.

Here, secret information item (password) A is encrypted (or enciphered) in encryptor (or encipherer) 500 with public key P, and the encrypted information item A' is transmitted via transmission line 600. At the side which receives the encrypted information item A', the item A' is decrypted (or deciphered) in decryptor (or decipherer) 700 with secret key Q to regenerate the original secret information item (password) A.

The merit of this public key encryption technique is that the original secret information item A can never be regenerated from encrypted information item A' and public key P alone.

First Embodiment

The registration and authentication method of the first embodiment according to the present invention will be explained below, with reference to FIGS. 1 and 2.

Figure 1:
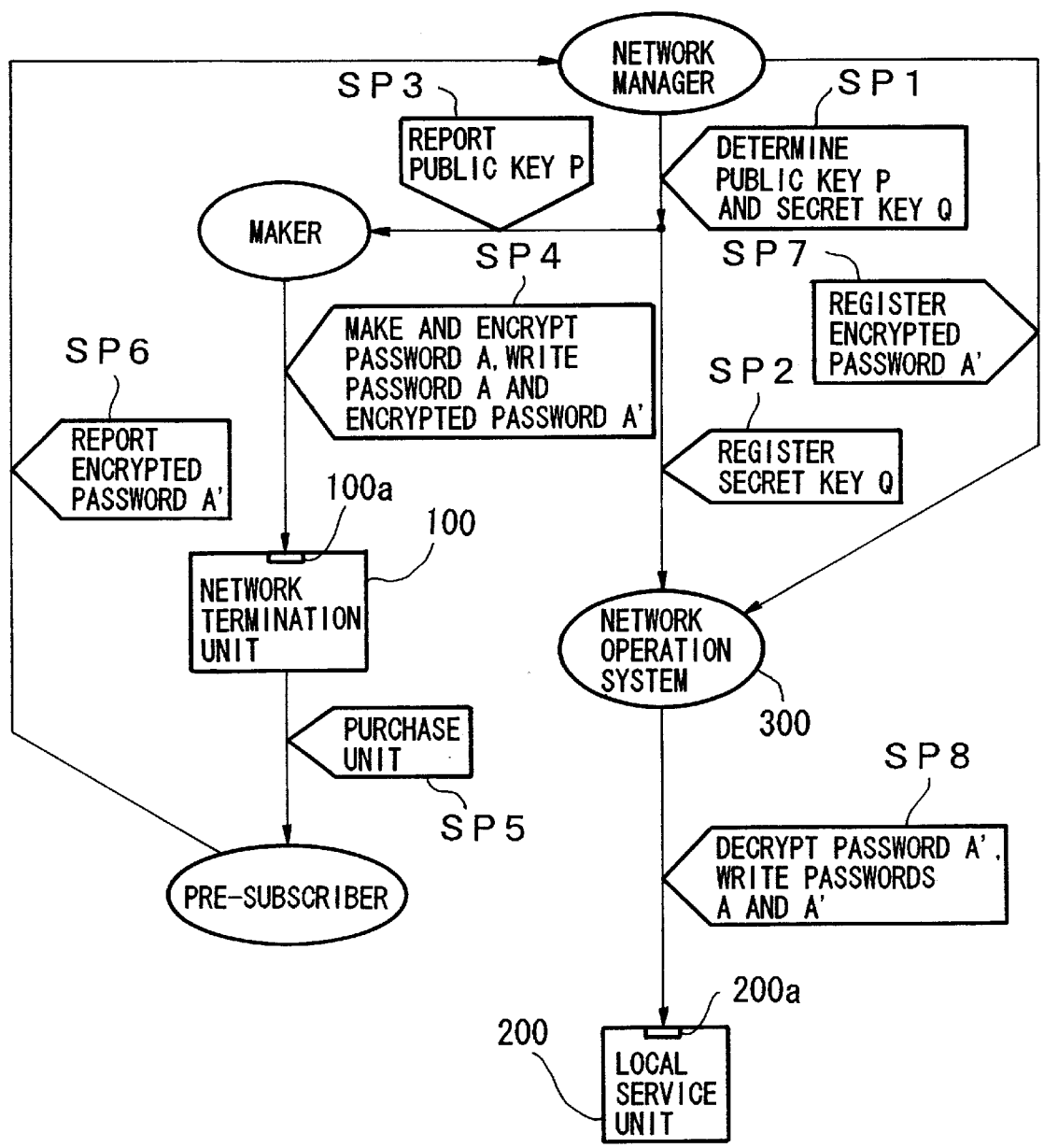
FIG. 1 shows the procedure for registering the password in the first embodiment of the present invention.

FIG. 1 shows the procedure up to a step in which the network termination unit 100 has been registered.

First, the network manager issues public key P and secret key Q which corresponds to the public key P (see step SP1), and registers the secret key Q in the network operation system 300 (see step SP2), while reporting the public key P to the maker of network termination units 100 (see step SP3).

When the maker produces (or forwards) each network termination unit, he makes password A which is a unit-own secret information item, and encrypts this password A with public key P. The maker then writes a pair of the unit-own password A and the encrypted password A' which is an encrypted information item of its original password into ROM 100a of the network termination unit 100 (see step SP4).

Next, a pre-subscriber who purchased the network termination unit 100 with such information (see step SP5) reports the encrypted password A', which is attached to the unit, to the network manager (see step SP6). The network manager registered this reported password A' in the network operation system 300 (see step SP7).

The network operation system 300 regenerates the original password A by decrypting the registered encrypted password A' with the secret key Q, and then transfers the encrypted password A' and the password A which is a decrypted information item of password A' to local service unit 200 where this pair of information items are stored in memory 200a (see step SP8). Here, the registration is completed.

Figure 2:
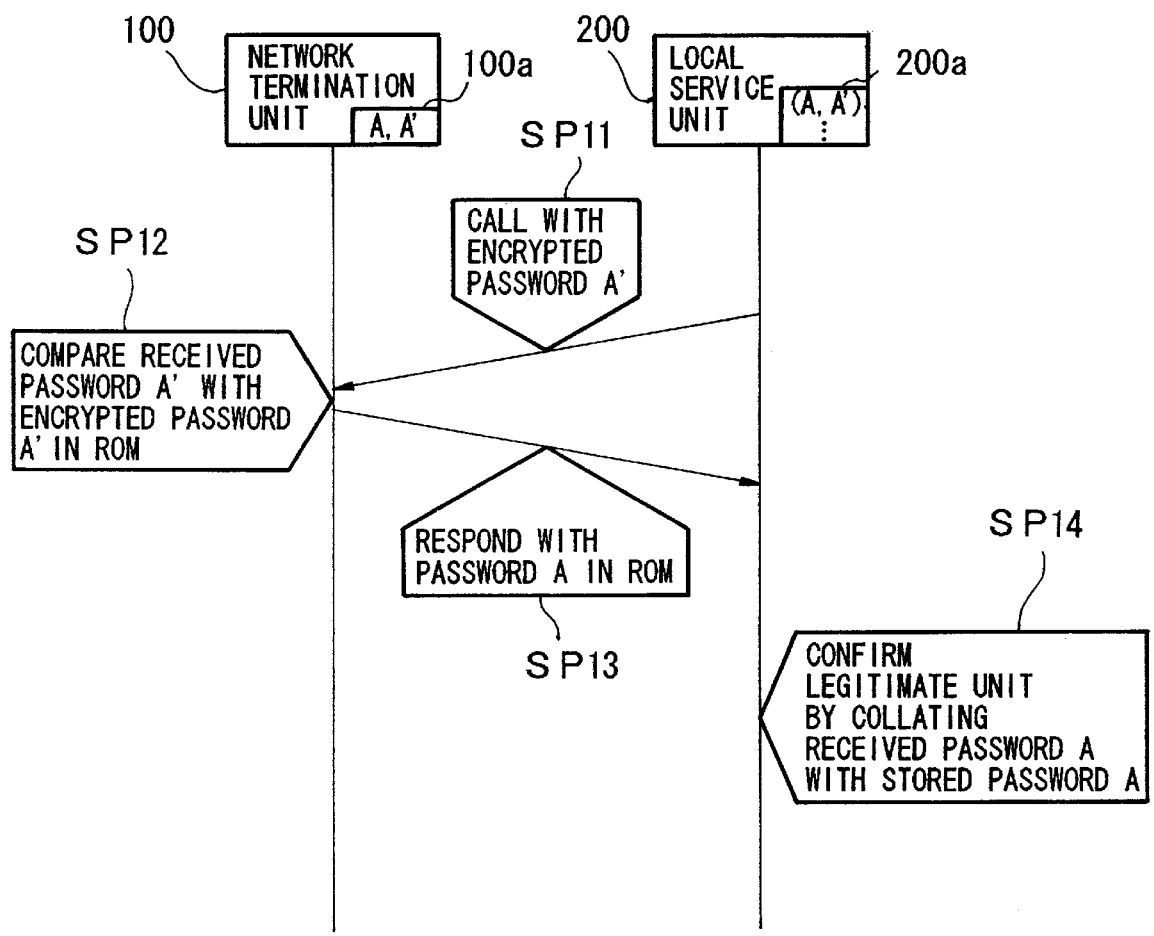
FIG. 2 shows the procedure performed at the beginning of the communication in the first embodiment of the present invention.

On the other hand, FIG. 2 shows the procedure for the communication between the local service unit and the registered network termination unit.

Local service unit 200 calls each registered network termination unit 100 with encrypted password A' at regular intervals (see step SP11). On the other hand, the called network termination unit 100 receives the encrypted password A' from the local service unit 200 when desiring the service, and compares it with its own encrypted password A' stored in ROM 100a (see step SP12). If these agree with each other, network termination unit 100 responds to the local service unit 200 by sending password A stored in the ROM (see step SP13), while if these don't agree, network termination unit 100 does not respond.

The local service unit 200 then confirms that the network termination unit has been regularly registered, by collating the received password A with the password A which is stored in pair-form with the encrypted password A' in memory 200a (see step SP14).

In case of using the above-explained registration and authentication procedure of the present embodiment, as far as the public key encryption technique is safe, the original password A is never regenerated from encrypted password A' and public key P alone. Therefore, there is no chance for anyone to pose as another subscriber except in the case that they stole the password A stored in the ROM of network termination unit 100, or they stole secret key Q which belongs to the network manager.

In addition, no large-size data base for storing a large quantity of ID numbers and passwords which covers all network termination units of all local areas is necessary, and no encryption/decryption circuit is necessary in both of units 100 and 200. Therefore, the units can be constructed by using simple circuits, and the system cost can be decreased.

Second Embodiment

Compared with the first embodiment, this second embodiment realizes automatic password registration from a remote terminal point, and also enhances the safety of the passwords. Hereinbelow, the registration and authentication method of the present embodiment will be explained with reference to FIGS. 3, 4, and 5.

Figure 3:
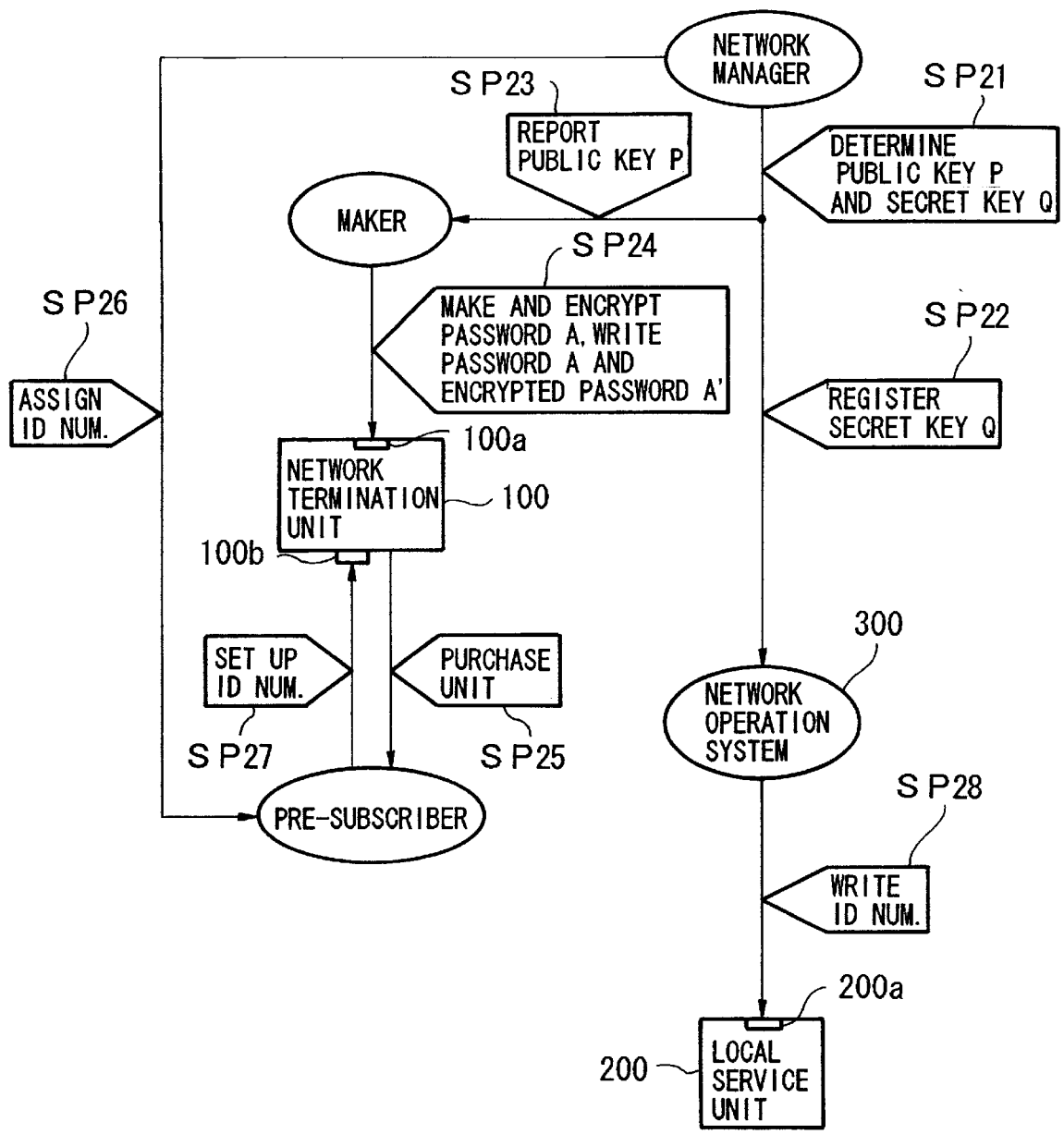
FIG. 3 shows the procedure for registering the ID number in the second embodiment of the present invention.

FIG. 3 shows the ID number registration steps before the steps of remote password registration of network termination unit 100.

First, the network manager issues public key P and secret key Q which corresponds to the public key P (see step SP21), and registers the secret key Q in the network operation system 300 (see step SP22), while reporting the public key P to the maker of network termination units 100 (see step SP23).

When the maker produces (or forwards) each network termination unit, he makes password A which is a unit-own secret information item, and encrypts this password A with public key P. The maker then writes a pair of the unit-own password A and the encrypted password A' which is an encrypted information item of its original password into ROM 100a of the network termination unit 100 (see step SP24). Up to here, the steps are the same as steps SP1~SP4 of the first embodiment.

Here, it will be noted that switch 100b (which can assign a value of a few digits) is provided in network termination unit 100 for setting up the ID number which identifies the network termination unit.

A pre-subscriber who purchased the network termination unit 100 (see step SP25) receives an ID number assigned by the network manager (see step SP26), and set up the number in the network termination unit 100 by using the above switch 100b (see step SP27).

On the other hand, the network manager registered this ID number, which he assigned to the pre-subscriber, in memory 200a of the local service unit 200 via network operation system 300 (see step SP28).

Figure 4:
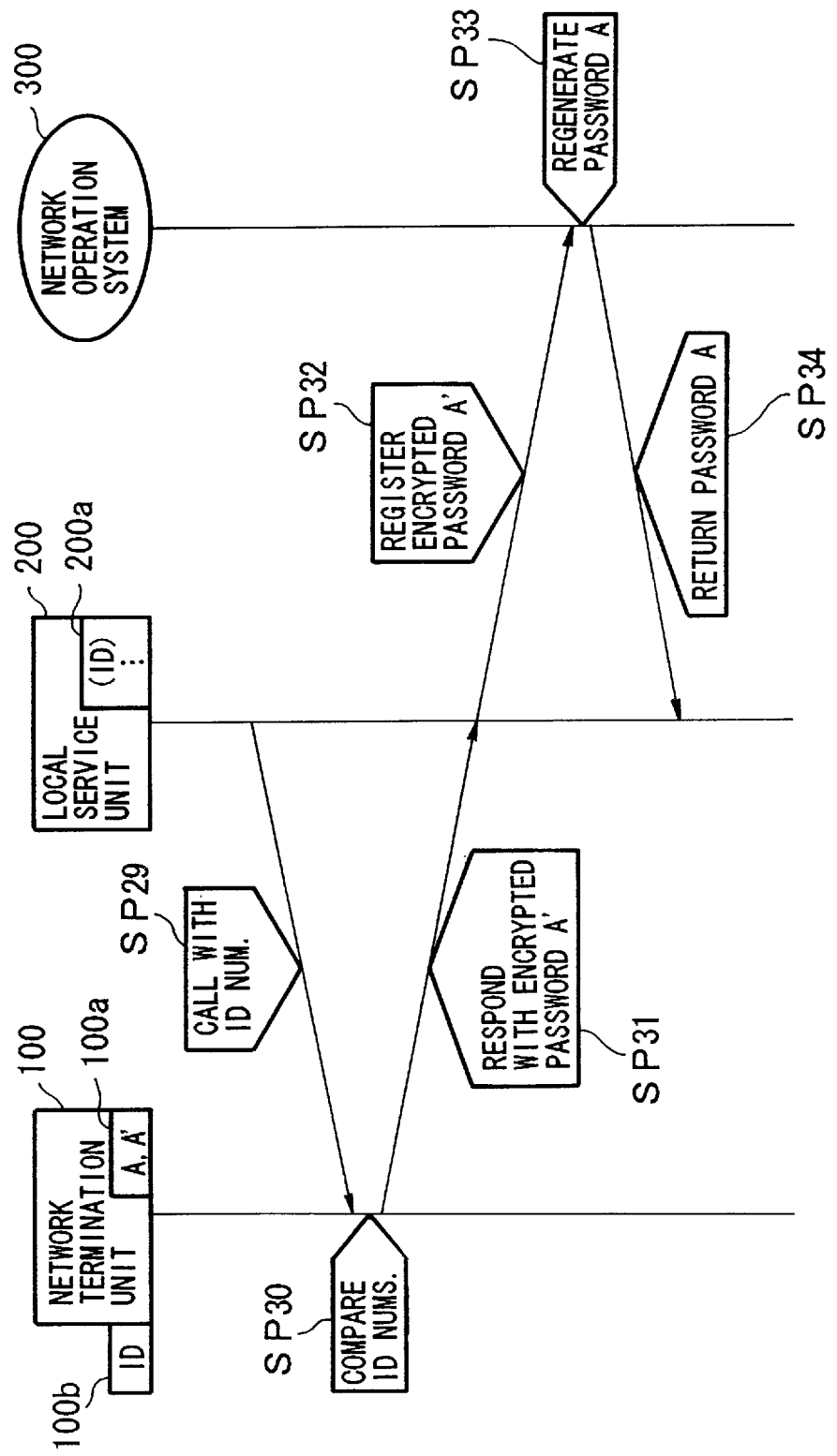
FIG. 4 shows the procedure for automatically registering the password in the second embodiment of the present invention.

FIG. 4 shows the procedure for the remote registration of network termination unit 100.

When the pre-subscriber connects the network termination unit 100 to network 400, local service unit 200 calls the network termination unit 100 by using the ID number (see step SP29). The network termination unit 100 who received the ID number compares it with its ID number which has been set up (see step SP12). If these agree with each other, network termination unit 100 responds to the local service unit 200 by sending encrypted password A' stored in ROM 100a (see step SP31), while if these don't agree, network termination unit 100 does not respond.

Next, the local service unit 200 sends the received encrypted password A' to network operation system 300 in order to register the password A' (see step SP32). The network operation system 300 decrypts the encrypted password A' with secret key Q to regenerate the original password A (see step SP33), and returns the password A to local service unit 200 (see step SP34). The encrypted password A' and the password A which is a decrypted information of the password A' are then stored in memory 200a of the local service unit 200 in group-form with the above ID number. Here, the registration is completed.

As explained above, in this embodiment, the network termination unit with its ID number which has been set up can automatically be registered only by connecting the unit to the network.

Figure 5:
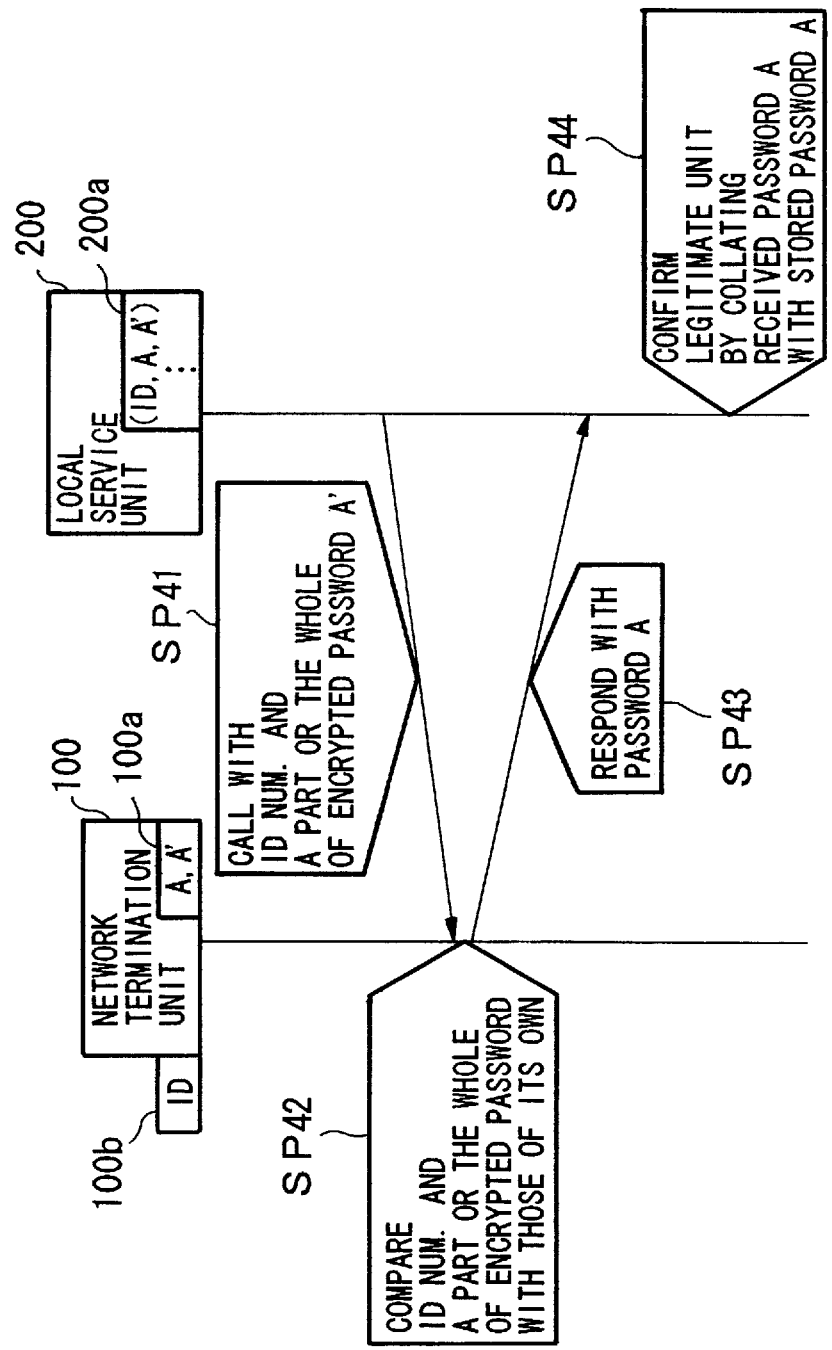
FIG. 5 shows the procedure at the beginning of the communication in the second embodiment of the present invention.
Figure 6:
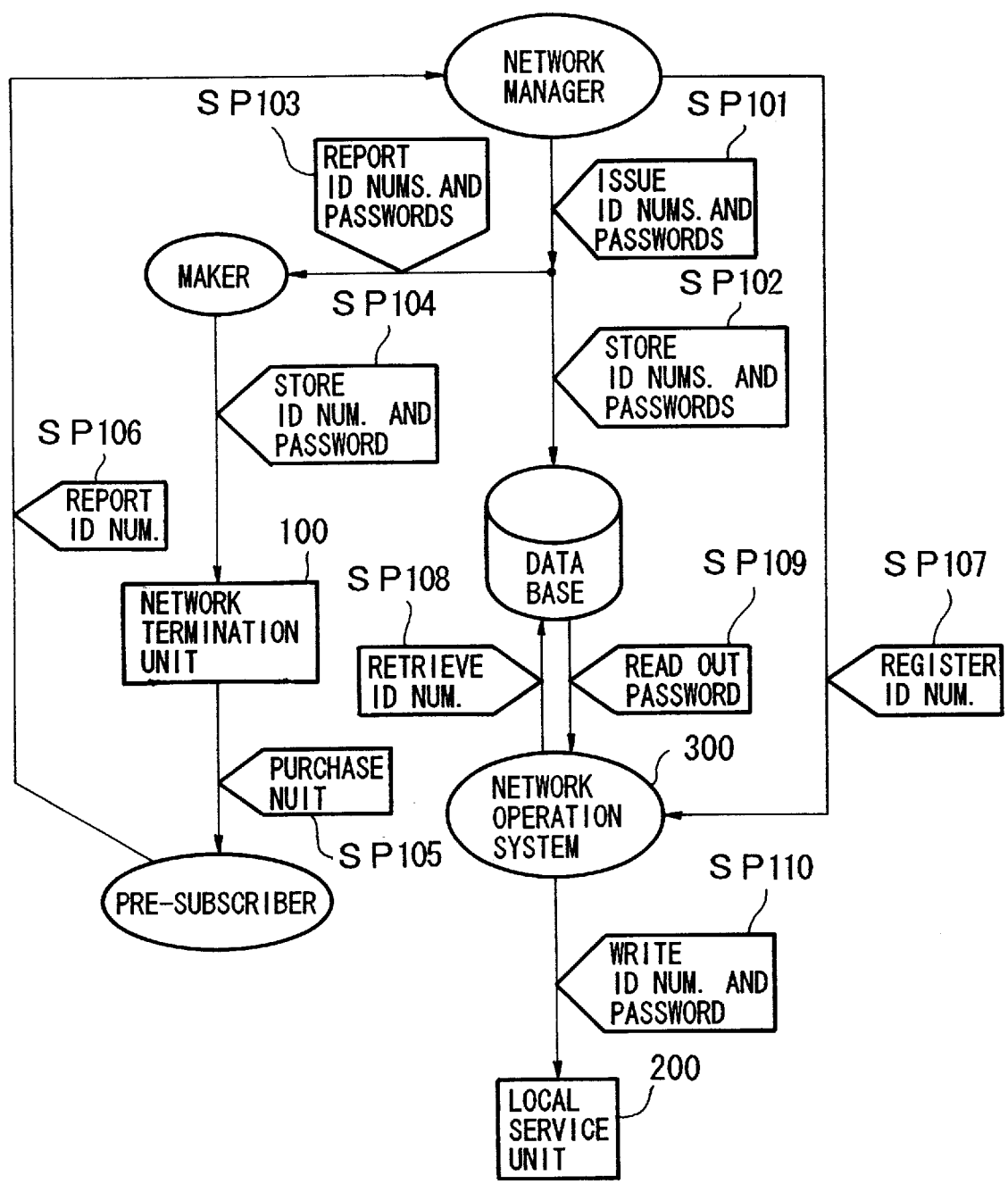
FIG. 6 shows a conventional procedure for registering the network termination unit.

Next, FIG. 5 shows the procedure for the communication between the local service unit and the registered network termination unit.

In this embodiment, local service unit 200 calls each network termination unit 100 by using ID number and a part or the whole of the encrypted password A' (see step SP41). That is, it is possible to transmit only a part of the encrypted password A' by using the ID number together.

When the called network termination unit 100, which desires the service, receives the ID number and a part or the whole of encrypted password A' from the local service unit 200, the network termination unit 100 compares these with its own ID number set on switch 100b and its own encrypted password A' stored in ROM 100a, respectively (see step SP42). If these agree with each other, network termination unit 100 responds to the local service unit 200 by sending password A stored in its ROM (see step SP43), while if these don't agree, network termination unit 100 does not respond.

The local service unit 200 then confirms that the network termination unit has been regularly registered, by collating the received password A with password A stored in memory 200a (see step SP44).

The conventional authentication procedure has been performed by network operation system 300 which supervises all local service units; therefore, very large digits are requested for the ID number because the network manager must identify each network termination unit in all local areas where the service can be enjoyed.

In contrast, in the present embodiment, each network termination unit must only be identified at the registration in a local network area dominated by the local service unit to which the network termination unit is connected; thus, only a few digits are enough for the ID number. In addition, it is possible to use only a part of the encrypted password A' for calling the network termination unit at the beginning of the communication by using the ID number together; therefore, the safety of the password can be improved.

The above-explained embodiments of the present invention are suitable for cases such as a PDS (Passive Double Star) type optical network transmission method in which the up direction of the network (that is, from the subscriber side to the service-offerer side) is safe with respect to any malicious subscriber who attempts to eavesdrop, unlike the case of the down direction.

If it is assumed that the network has a form in which the safety of the up direction would not be secured, safe authentication can also be realized by jointly using a procedure, such as that standardized in JTC1/DP9798 of ISO, for indirectly certifying that the network termination unit has a password, not by returning the password itself to the local service unit. For example, when calling the network termination unit, the local service unit sends the encrypted password and additional random data R. The network termination unit encrypts this random data R with the password as a secret key, based on a secret key encryption technique such as DES (data encryption standard), FEAL (fast data encipherment algorithm), and the like, and sends back the encrypted random data to the local service unit. The local service unit decrypts the received random data, and if the decrypted data and the random data which has been sent agree with each other, confirms that the network termination unit has been regularly registered. In this case, encryption and decryption circuits are needed in the units. However, the scale of such circuits for the secret key encryption technique such as DES and FEAL is much smaller than that for any public key encryption technique; thus, even if using this method in a network on which eavesdropping may occur, a small circuit scale, one of the merits of the present invention, can also be realized.

It is obvious from the above explanation that according to the present invention, highly safe authentication by making use of the one-directional characteristic of the public key encryption technique can be realized, by which the circuit size of each unit can be small. In addition, by setting up the ID number in each network termination unit for identifying it, the automatic and remote registration of the network termination unit can be realized when the unit is connected to the network. That is, it is no more necessary to previously register the encrypted password to the local service unit according to the report from a subscriber. Furthermore, it is possible to use only a part of the password for calling the network termination unit at the beginning of the communication by using the ID number together; thus, the safety of the password can be much more improved.

In U.S. Pat. No. 5,249,230 (Mihm, Jr.), the authentication center (which corresponds to the network operation system) generates the public and secret keys, and authentication modules are made according to registration information on subscribers and the secret key. Each authentication module is sent to the corresponding subscriber by mail. Furthermore, the authentication center send the corresponding public key to the authentication node (which corresponds to the local service unit).

At beginning the communication, the network termination unit (the user terminal) sends the log-on message which has been generated by the attached authentication module to the authentication node. The authentication node then decrypts the log-on message with the public key and confirms that the log-on message has been formally registered.

The method of Mihm, Jr. differs from the present invention in the following points:

(1) The network termination unit has only the user ID and the equipment ID, and does not have any secret information item as shown in the present invention.

(2) The function that the authentication node (corresponding to the network operation system) decrypts the log-on message sent from the network termination unit by using the public key is needed.

(3) The authentication center must have subscriber-information data base and manage the user and equipment IDs of subscribers and the expiration dates of the public and secret keys.

That is, in the method of Mihm, Jr., if a malicious user gets the log-on message of another person (i.e., if a malicious user eavesdrops), he can easily perform the communication by impersonating said another person; therefore, a problem with safety will occur. Accordingly, Mihm, Jr.'s method must set the expiration date for each key and regularly change the public and secret keys (refer to item (3)), whereby the system cost will be increased. This problem is basically caused by the above item (1).

In the present invention, the network termination unit and the local service unit can have necessary secret information jointly. Therefore, in the case of using a transmission line on which eavesdropping may occur, it is possible to indirectly prove that the network termination unit has the secret information item by encrypting any received information with the secret information item as a key (based on the secret key encryption technique such as DES, FEAL, and the like) and sending back the encrypted information, without directly sending the secret information item. Accordingly, the safety of the line can also be secured.

On the other hand, in Japanese Patent Application, First Publication, No. Sho 61-72437, the authentication of the communication partner is performed such that two subscribers send and receive secret information with each other, the information being obtained by encryption with a public key which was sent from the authentication center, and each subscriber decrypts the secret information with a secret key of its own. In this case, encryption and decryption circuits for the public key encryption must be provided in the network termination unit; therefore, this method also differs from the present invention.

What is claimed is:

1. A subscriber registration and authentication method, used in a communication service system in which plural network termination units are connected via a communication network with a local service unit controlled by an operation system which is managed by a network manager and the local service unit provides services for each registered network termination unit, said method for registering each network termination unit for the local service unit and authenticating the registered network termination unit before providing the service, wherein:

each network termination unit has a peculiar secret information item for identifying the network termination unit and an encrypted information item obtained by encrypting the secret information item with a public key which is determined by the network manager, and said method comprises:

step (r), performed by the operation system, of decrypting the encrypted information item stored in the network termination unit which will be registered by using a secret key which is determined by the network manager, and registering this network termination unit for the local service unit by writing the encrypted and decrypted information items into the local service unit;

step (c1), performed by the local service unit at the beginning of providing the service, of calling the network termination unit as a communication partner by sending the encrypted information item which is peculiar for the network termination unit;

step (c2), performed by the called network termination unit, of comparing the received encrypted information item with the encrypted information item of its own, and if these agree with each other, responding to the local service unit by using the secret information item of its own; and step (c3), performed by the local service unit, of confirming that the network termination unit as a communication partner has been regularly registered by collating the information item received from the network termination unit with the information item of its own.

2. A subscriber registration and authentication method as claimed in claim 1, wherein the network termination unit has a ROM, and the secret information item which is peculiar to the network termination unit and the encrypted information item obtained by the encryption with the public key are previously stored as a pair of information items in the ROM.

3. A subscriber registration and authentication method as claimed in claim 1, wherein each network termination unit has a setting means for setting up an ID number assigned by the network manager, the number being peculiar to the network termination unit, and the method further comprises:

step (a1), performed by the operation system, of writing the ID number into the local service unit;

step (a2), performed by the local service unit when the network termination unit which has the set ID number and will be registered is connected to the communication network, of calling the corresponding network termination unit by sending the ID number;

step (a3), performed by the network termination unit called by the local service unit, of comparing the received ID number with the ID number which has been set up by the setting means, and if these agree with each other, sending the encrypted information item of its own to the local service unit; and step (a4), performed by the local service unit, of transferring the encrypted information item received from the network termination unit to the operation system, and the step (r) performed by the operation system comprises decrypting the transferred encrypted information item with the secret key, and registering this network termination unit for the local service unit by writing the encrypted and decrypted information items and the ID number as a group of information items.

4. A subscriber registration and authentication method as claimed in claim 3, wherein:

the step (c1) performed by the local service unit at the beginning of providing the service comprises calling the network termination unit as a communication partner by sending a part or the whole of the encrypted information item and the ID number which correspond to the network termination unit; and the step (c2) performed by the called network termination unit comprises comparing a part or the whole of the encrypted information item and the ID number which have been received with the corresponding encrypted information item and ID number of its own, and if these agree with each other, responding to the local service unit by using the secret information item of its own.

* * * * *